(12) United States Patent
Suzuki et al.

(10) Patent No.: US 8,235,604 B2
(45) Date of Patent: Aug. 7, 2012

(54) OPTICAL CONNECTOR AND FIBER MODULE

(75) Inventors: Kanako Suzuki, Hitachi (JP); Seiji Kojima, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 190 days.

(21) Appl. No.: 12/748,927

(22) Filed: Mar. 29, 2010

(65) Prior Publication Data

US 2010/0247042 A1 Sep. 30, 2010

(30) Foreign Application Priority Data

Mar. 30, 2009 (JP) ................................ 2009-082309
Mar. 30, 2009 (JP) ................................ 2009-082312

(51) Int. Cl.
*G02B 6/36* (2006.01)
(52) U.S. Cl. .......................................... 385/88; 385/14
(58) Field of Classification Search .................... 385/88, 385/14
See application file for complete search history.

(56) References Cited

U.S. PATENT DOCUMENTS

| | | | | |
|---|---|---|---|---|
| 4,461,537 A | * | 7/1984 | Raymer et al. ................ | 385/88 |
| 4,861,134 A | * | 8/1989 | Alameel et al. ............... | 385/135 |
| 5,069,525 A | * | 12/1991 | Seike et al. ................... | 385/100 |
| 5,078,515 A | * | 1/1992 | Soulard et al. ................ | 385/89 |
| 5,155,785 A | | 10/1992 | Holland et al. | |
| 6,390,690 B1 | * | 5/2002 | Meis et al. .................... | 385/88 |
| 6,623,177 B1 | * | 9/2003 | Chilton ......................... | 385/88 |
| 6,857,790 B2 | * | 2/2005 | Fontecha et al. .............. | 385/92 |
| 6,915,029 B2 | * | 7/2005 | Lee et al. ...................... | 385/14 |
| 7,527,435 B2 | * | 5/2009 | Dean et al. .................... | 385/78 |
| 2002/0028056 A1 | * | 3/2002 | Fontecha et al. .............. | 385/137 |
| 2002/0118917 A1 | | 8/2002 | Kawai | |
| 2003/0156327 A1 | * | 8/2003 | Terakawa et al. ............. | 359/592 |
| 2003/0223707 A1 | * | 12/2003 | Nakanishi et al. ............ | 385/92 |
| 2004/0136725 A1 | * | 7/2004 | Miyamae et al. ............. | 398/164 |
| 2005/0175293 A1 | * | 8/2005 | Byers et al. ................... | 385/88 |
| 2006/0198584 A1 | * | 9/2006 | Suzuki et al. ................. | 385/92 |
| 2008/0025674 A1 | | 1/2008 | Sasaki | |
| 2010/0232743 A1 | * | 9/2010 | Ishikawa et al. .............. | 385/14 |

FOREIGN PATENT DOCUMENTS

| | | | |
|---|---|---|---|
| JP | 01234805 A | * | 9/1989 |
| JP | 07176716 | | 7/1995 |
| JP | 2000214353 | | 8/2000 |
| JP | 2006-091684 | | 4/2006 |
| JP | 2006154553 | | 6/2006 |
| JP | 2007041222 | | 2/2007 |
| JP | 2007-256372 | | 10/2007 |
| JP | 2007-271998 | | 10/2007 |
| JP | 2008-052028 | | 3/2008 |
| JP | 2009031380 | | 2/2009 |

* cited by examiner

*Primary Examiner* — Charlie Peng
*Assistant Examiner* — Peter Radkowski
(74) *Attorney, Agent, or Firm* — Brundidge & Stanger, P.C.

(57) ABSTRACT

An optical connector that permits an optical fiber ribbon to be led out in multiple directions and an optical fiber module that uses the optical connector are provided. The optical connector comprises a connector main body and a guide groove formed on the connector main body in which an optical fiber ribbon is arranged, wherein the guide groove is comprised of an end face holding slot, a vertical guiding face, an arcuate guiding face formed in arc-shape, and a positioning face for widthwise positioning and fixing the optical fiber ribbon and wherein the vertical guiding face and the arcuate guiding face and the positioning face define a space that opens toward a top face of the connector main body; and the optical fiber module comprises the optical fiber ribbon and the optical connector.

9 Claims, 11 Drawing Sheets

OPTICAL CONNECTOR AND FIBER MODULE

TECHNICAL FIELD

The present invention relates to an optical connector for connecting an optical fiber ribbon optically with arrayed optical elements and an optical fiber module that uses the optical connector.

BACKGROUND ART

Attention has been focused on the optical transmission system with optical interconnection technique as an optical transmission technology for intra- or inter-equipment. In the optical interconnection system for this category of application, arrayed optical elements such as the Vertical-Cavity Surface-Emitting Laser (VCSEL), which is easy to configure a multi-channel array, has been generally used.

Figure 16:
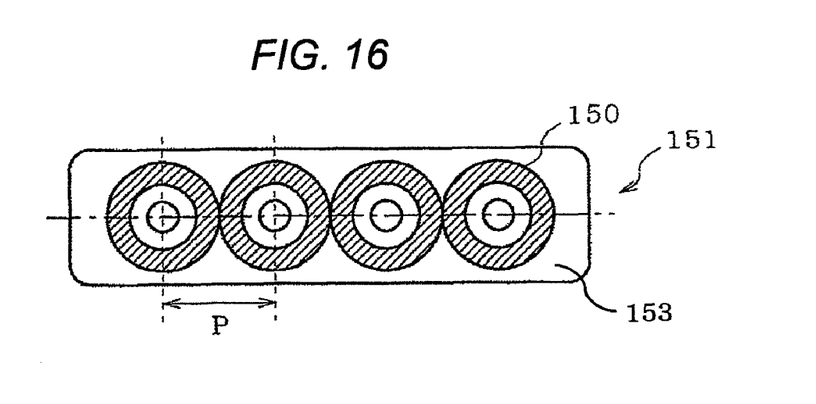
FIG. 16 This figure is a cross-sectional view of the optical fiber ribbon.

Establishing the optical transmission between groups of arrayed optical elements has used an optical fiber ribbon 151 as shown in FIG. 16 for example. The construction of the optical fiber ribbon 151 is such that: a plurality of optical fibers 150 (four fibers as an example shown in FIG. 16) are aligned flat at a pitch or spacing of P equal to the arraying pitch in the arrayed optical elements and then aligned optical fibers are commonly jacketed with a resin 153.

Figure 17:
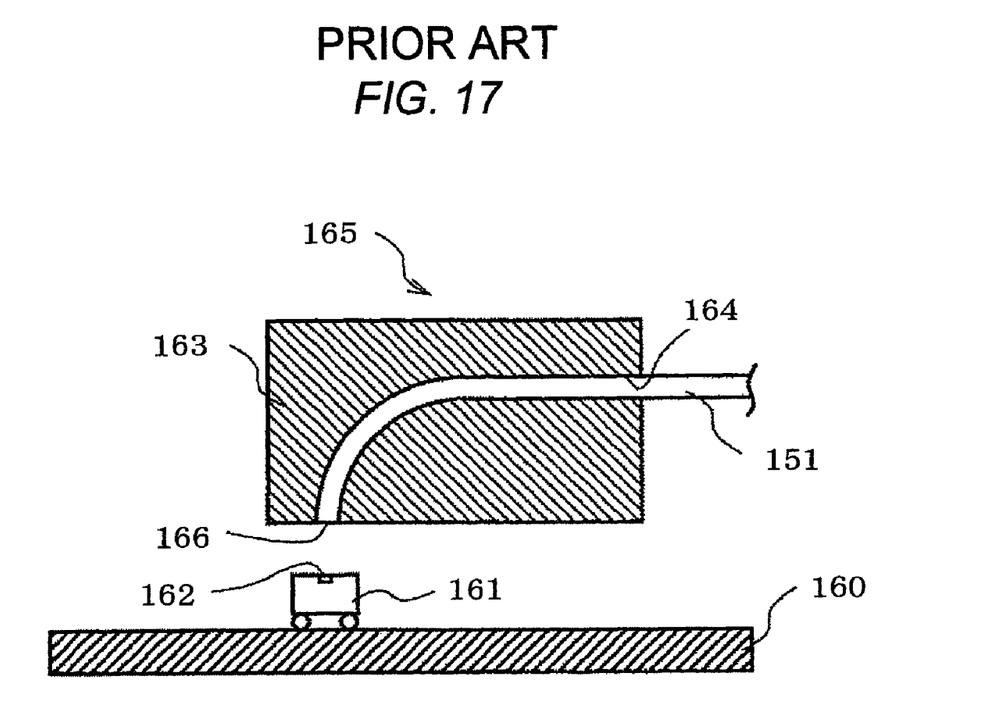
FIG. 17 This figure is a cross-sectional view of the conventional optical connector mounted on a substrate.

At the end of the optical fiber ribbon 151 as shown in FIG. 17, an optical connector 165 is installed to connect the fiber end thereof optically with the surface-emitting face (or surface-receiving face) 162 of arrayed optical elements 161 mounted on a substrate 160 (refer to Patent Literatures 1 to 3 for example).

In a conventional art, to connect the optical fiber ribbon 151 optically with the surface-emitting face (or surface-receiving face) 162 of the arrayed optical elements 161 mounted on the substrate 160 using the optical connector 165, the optical fiber ribbon 151 runs in a guiding slot 164 provided on a connector main body 163 so that the end face of the optical fiber ribbon 151 will oppose to each surface-emitting face (or surface-receiving face) 162 of the arrayed optical elements 161 mounted on the substrate 160.

As described above, the construction of the optical connector 165 in a conventional art was such that the optical fiber ribbon 151 is bent within the connector main body 163 so that the optical path will turn its direction while running between the bottom face of the connector main body 163 and the side face thereof to permit leading out the optical fiber ribbon 151 from a desired face (side face for example) of the connector main body 163.

In manufacturing optical fiber modules, the optical fiber ribbon 151 is arranged in the guiding slot 164 so that the tip thereof will project out of the bottom face of the connector main body 163, and then the end of the optical fiber ribbon 151 and the bottom face of the connector main body 163 are polished together to obtain an end face 166.

The reason of polishing the tip of the optical fiber ribbon 151 is to make the end face 166 of the optical fiber ribbon 151 flat. If not flat, signal light will make diffused reflection or other disorder at the end face 166 resulting in the light loss increase.

In the conventional art for manufacturing optical fiber modules therefore, the end face 166 is cleaved with such as a fiber cutter in advance and then the tip thereof is polished to make the end face 166 flat.

Patent Literature 1
Japanese Patent Application Laid-Open No. 2007-256372
Patent Literature 2
Japanese Patent Application Laid-Open No. 2008-52028
Patent Literature 3
Japanese Patent Application Laid-Open No. 2006-91684
Patent Literature 4
Japanese Patent Application Laid-Open No. 2007-271998

SUMMARY OF INVENTION

In recent years, miniaturization of equipment is demanded. To respond to this, wiring optical fiber ribbons must be accommodated within a limited room. This requirement for wiring has brought a problem such that leading out the optical fiber ribbon is sometimes not practicable except only in a specific direction for example either perpendicular to or parallel to the substrate.

Conventional optical connectors has had a problem such that leading out the optical fiber ribbon is restricted only to a particular direction (from the side face of the connector main body 163 for example); because of this, the wiring operation is forced to be sophisticated or to properly use different style of connectors according to the desired lead-out direction.

The optical fiber 150 to be used in the optical fiber ribbon 151 usually has a first coating layer (a primary layer) applied over its bare fiber, comprised of the core and the clad, and a second coating layer (secondary layer) applied over the first coating layer, wherein the second coating layer has a Young's modulus higher than that of the first coating layer. In a conventional optical fiber module, the optical fiber 150 is arranged in the guiding slot 164 and then the bottom face of the connector main body 163 (the connection face with a substrate) is polished; while undergoing this polishing, the first coating layer may sometimes peel off because of its being soft.

This, being attributable to the polishing, develops to a breakage of the tip of the optical fiber 150 at the portion having no first coating layer or to a bend of the tip of the optical fiber 150. These cause a positional deviation with the arrayed optical elements 161 on the substrate 160 resulting in the connection loss increase due to a misaligning of the optical axis with the transmission signal deteriorated.

The purpose of the present invention is to provide an optical connector that permits an optical fiber ribbon to be lead out in multiple directions and an optical fiber module that permits an optical fiber ribbon to be connected optically with arrayed optical elements without polishing the end face of the optical fiber ribbon.

Means for Solving the Problems

The present invention is devised to accomplish the purpose stated above. The invention defined in claim 1 is: an optical connector for connecting the end face of an optical fiber ribbon optically with arrayed optical elements on a substrate, comprising a connector main body having a bottom face parallel to the substrate; and a guide groove formed on the connector main body in which the optical fiber ribbon is arranged; the guide groove comprising an end face holding slot that holds the optical fiber ribbon so that the end face of the optical fiber ribbon on the bottom face of the connector main body facing the substrate will oppose to the arrayed optical elements, a vertical guiding face perpendicular to the substrate and extending from one side of the end face holding slot on the bottom face of the connector main body to the top face thereof, an arcuate guiding face formed in an arc-shape extending from the opposing other side of the end holding slot to the side face of the connector main body, and a positioning face for widthwise positioning and fixing the optical fiber ribbon formed perpendicularly to the substrate adjoining both the vertical guiding face and the arcuate guiding face, wherein the vertical guiding face and the arcuate guiding face and the positioning face define a space that opens toward the top face of the connector main body.

The invention defined in claim 2 is: the optical connector according to claim 1, wherein the arcuate guiding face of the guide groove ends in the side face of the connector main body at a position lower than the top face thereof by a distance equal to the thickness of the optical fiber ribbon or more distance.

The invention defined in claim 3 is: the optical connector according to claim 1 or claim 2, wherein the connector main body has a plurality of the guide grooves.

The invention defined in claim 4 is: the optical connector according to any one of claims 1 to 3, wherein the bottom portion of the guide groove on the bottom face of the connector main body is formed integrally in one body with the connector main body and is sealed.

The invention defined in claim 5 is: the optical connector according to any one of claims 1 to 4, wherein the connector main body has a lens provided integrally in one body with the bottom face thereof which bottom face is opposed to the end face of the guide groove.

The invention defined in claim 6 is: the optical connector according to any one of claims 1 to 4, wherein the connector main body has a transparent substrate provided integrally in one body with the bottom face thereof which face is opposed to the end face of the guide groove.

The invention defined in claim 7 is: the optical connector according to claim 1, wherein the connector main body is further comprised of a vertical guiding slot for arranging the optical fiber ribbon perpendicularly to the substrate.

The invention defined in claim 8 is: an optical fiber module comprising an optical fiber ribbon and an optical connector for connecting the end face of the optical fiber ribbon with arrayed optical elements on a substrate, wherein the optical connector is comprised of an optical connector defined in claim 1 that has a connector main body having a bottom face parallel to the substrate and a guide groove provided on the connector main body for arranging the optical fiber ribbon, wherein a resin having the same refractive index as the core of the optical fiber ribbon is filled in the guide groove formed on the connector main body for making one end of the optical fiber ribbon arranged perpendicularly to the substrate at the bottom face of the connector main body so as to intervene between the end face of the optical fiber ribbon and the bottom face of the connector main body.

According to the present invention, an optical fiber ribbon can be lead out in multiple directions. Further, the optical fiber ribbon can be connected optically with arrayed optical elements without polishing the end face of the optical fiber ribbon.

DESCRIPTION OF EMBODIMENTS

The following will explain preferred modes of implementing the present invention referring to attached drawings.

The optical connector by the present invention is to connect the end face of an optical fiber ribbon optically with arrayed optical elements on a substrate.

FIG. 1(a) is a perspective view of the optical connector according to Embodiment 1 of the present invention; FIG. 1(b) is a cross-sectional view of the optical connector shown in FIG. 1(a) sectioned along the line 1B-1B; and FIG. 1(c) is a perspective view of an optical fiber module having an optical fiber ribbon and the optical connector.

Figure 1:
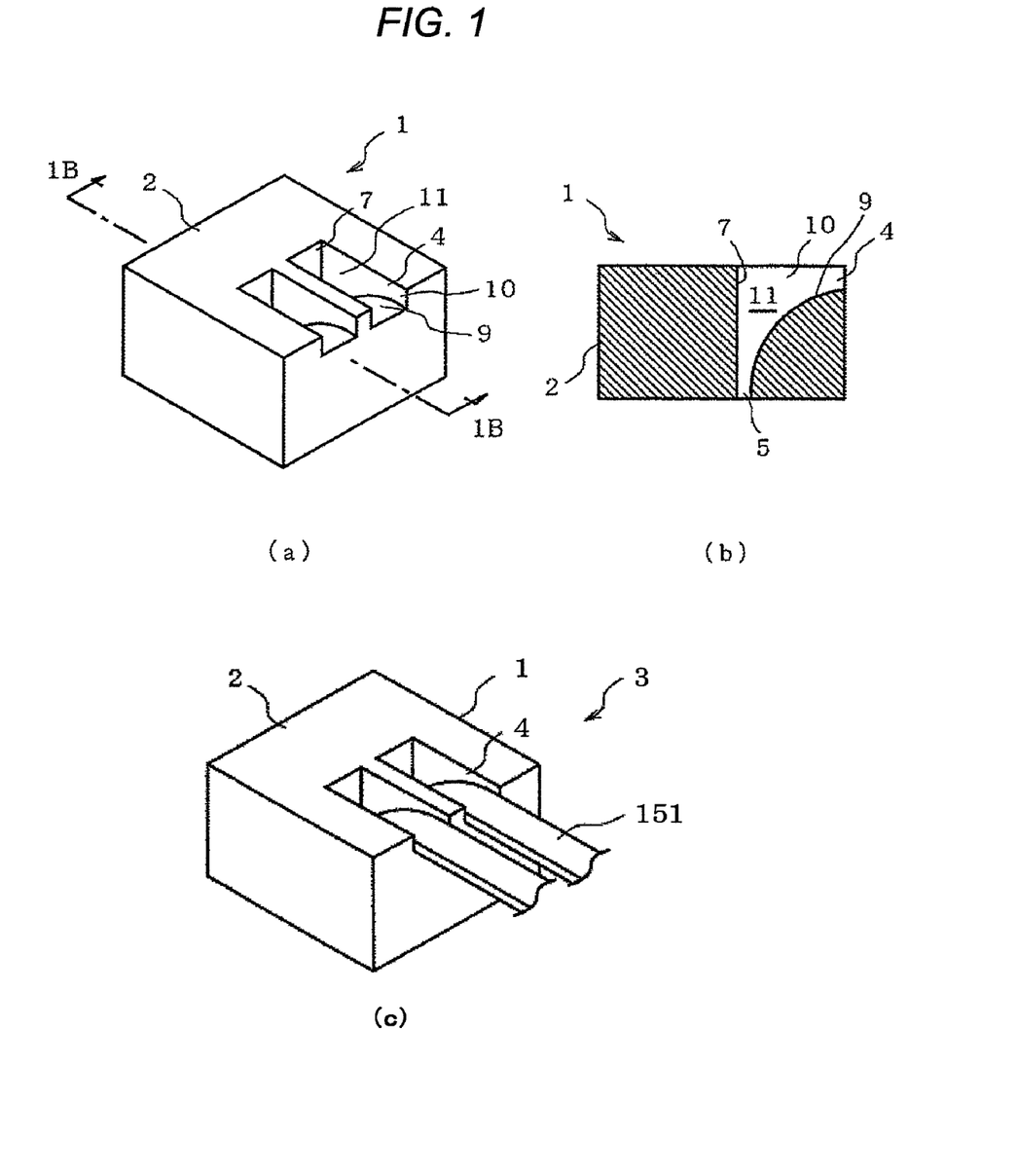
FIG. 1(a) is a perspective view of the optical connector according to an embodiment of the present invention.
FIG. 1(b) is a cross-sectional view of the optical connector shown in FIG. 1(a) sectioned along the line 1B-1B.
FIG. 1(c) is a perspective view of an optical fiber module having an optical fiber ribbon and the optical connector.

As shown in FIGS. 1(a) and 1(b), an optical connector 1 has such a construction that a connector main body 2 formed by resin molding has one or more guide grooves 4 (two grooves in FIG. 1).

The connector main body 2 is a rectangular solid and has a bottom face parallel to a substrate on which arrayed optical elements are mounted.

The guide groove 4 is comprised of: an end face holding slot 5 that holds an optical fiber ribbon so that the end face of the optical fiber ribbon on the bottom face of the connector main body 2 facing the substrate will oppose to the arrayed optical elements, a vertical guiding face 7 perpendicular to the substrate and extending from one side of the end face holding slot 5 (in FIG. 1(*b*), the left side face thereof) on the bottom face of the connector main body 2 to the top face thereof, an arcuate guiding face 9 formed in an arc-shape extending from the opposing other side of the end holding slot 5 (in FIG. 1(*b*), the right side face thereof) on the bottom face of the connector main body 2 to the side face thereof, and a positioning face 10 for widthwise positioning and fixing the optical fiber ribbon formed perpendicularly to the substrate adjoining both the vertical guiding face 7 and the arcuate guiding face 9, wherein the vertical guiding face 7 and the arcuate guiding face 9 and the positioning face 10 define a space 11 that opens toward the top face of the connector main body 2. Thus, the guide groove 4 has a shape that enlarges upwardly its opening.

The arcuate guiding face 9 of the guide groove 4 is preferred to end in the side face of the connector main body 2 at a position lower than the top face thereof by a distance equal to the thickness of the optical fiber ribbon or more distance. This is for prevention of bulge-out of the optical fiber ribbon out of the top face of the connector main body 2 when the optical fiber ribbon is fixed along the arcuate guiding face 9.

Figure 2:
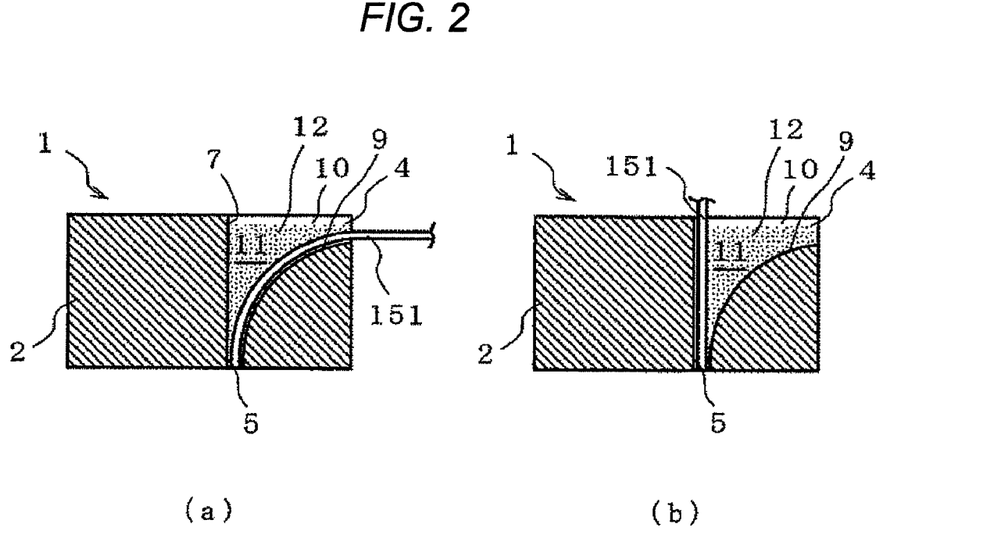
FIG. 2(a) is a cross-sectional view of the optical connector in which the optical fiber ribbon is fixed so as to be led out in the side face of the optical connector shown in FIG. 1.
FIG. 2(b) is a cross-sectional view of the optical connector in which the optical fiber ribbon is fixed so as to be led out in the top face of the optical connector shown in FIG. 1.

When an optical fiber ribbon 151 is placed along the arcuate guiding face 9 of the guide groove 4 as shown in FIG. 2(*a*), the optical fiber ribbon 151 is lead out in the side face of the connector main body 2.

Further, when the optical fiber ribbon 151 is placed along the vertical guiding face 7 of the guide groove 4, the optical fiber ribbon 151 is led out in the top face of the connector main body 2.

Moreover, since the space 11 defined by the vertical guiding face 7 and the arcuate guiding face 9 and the positioning face 10 opens to the top face of the connector main body 2, the direction of leading out the optical fiber ribbon 151 can be chosen as desired within the range from the arcuate guiding face 9 to the vertical guiding face 11.

Thus, the optical connector 1 permits the optical fiber ribbon 151 to be lead out in multiple directions. Employing above-stated methods, an optical finer module having the optical fiber ribbon 151 and the optical connector 1 (FIG. 1(*c*)) is manufactured.

Into the space 11 of the guide groove 4, a resin 12 is filled and then cured to fix the optical fiber ribbon 151. As for the resin 12, UV-curable resin or thermo-setting resin for example is preferable.

As an example, the fixing method of the optical fiber ribbon 151 on the connector main body 2 will be explained for the case that the optical fiber ribbon 151 is led out from the side face of the connector main body 2 referring to FIGS. 3(*a*) to 3(*c*).

Figure 3:
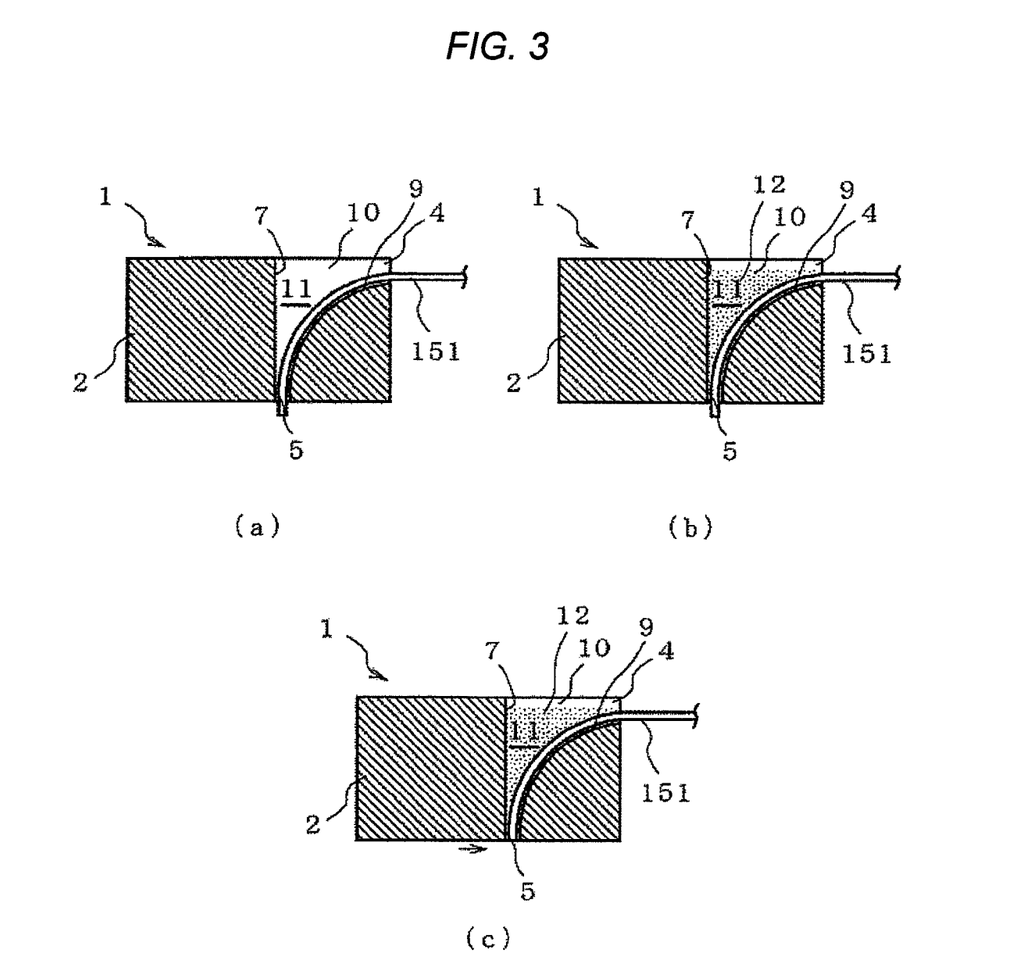
FIGS. 3(a) to 3(c) are figures for explanation of method of fixing the optical fiber ribbon.

As shown in FIG. 3(*a*), the optical fiber ribbon 151 is arranged along the arcuate guiding face 9 of the guide groove 4. In this arrangement, the tip of the optical fiber ribbon 151 is positioned so that the tip will project from the underface of the connector main body 2.

Then as shown in FIG. 3(*b*), the space 11 of the guide groove 4 is filled with the resin 12, which is thereafter cured to fix the optical fiber ribbon 151.

After the resin 12 had cured, the tip of the optical fiber ribbon 151 projected from the underface of the connector main body 2 is cleaved and polished as shown in FIG. 3(*c*).

Thus, the cleaving of the tip of the optical fiber ribbon 151 after glue-and-fix makes it flat at the end face of the optical fiber ribbon 151 establishing a good optical connection with the arrayed optical elements.

Methods of fixing the optical fiber ribbon 151 on the connector main body 2 are not limited to above-stated practice.

Figure 4:
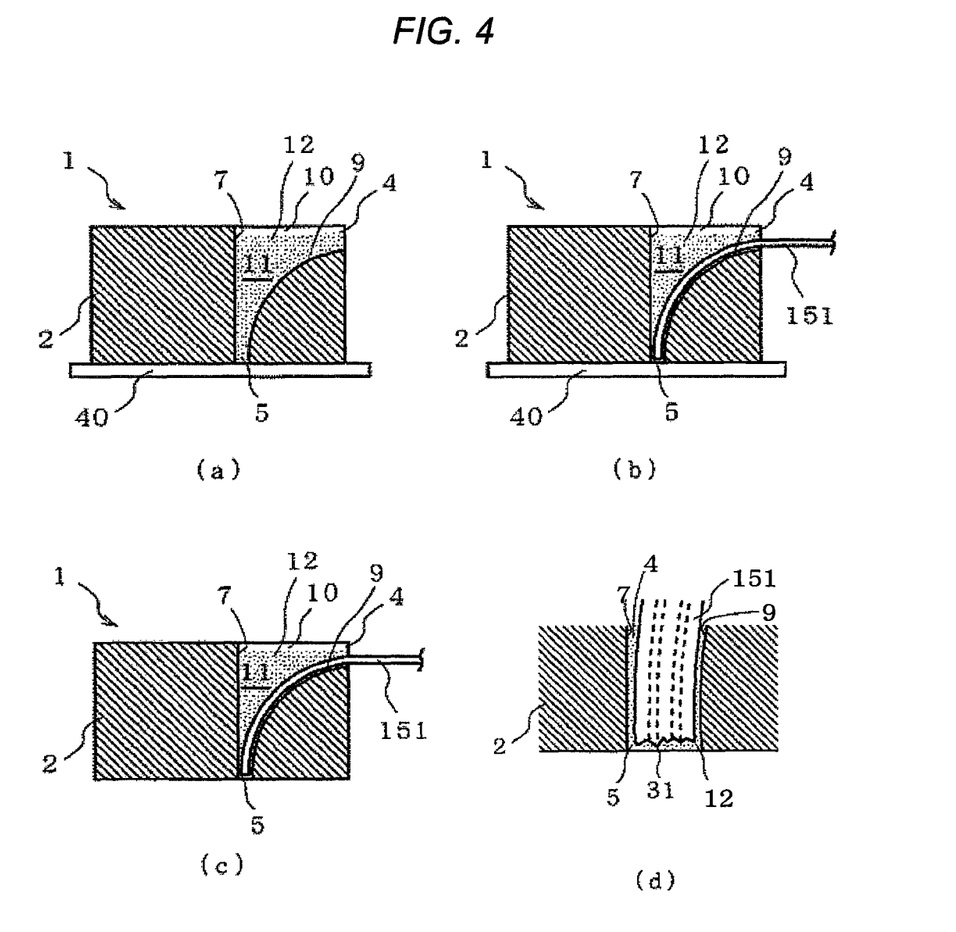
FIGS. 4(a) to 4(d) are figures for explanation of another method of fixing the optical fiber ribbon.

The optical fiber ribbon 151 can be fixed as shown in FIG. 4(*a*) for example by a method comprising the processes of: placing the connector main body 2 on a plate 40 having a smooth-face such as glass plate; filling the guide groove 4 with the resin 12; arranging the optical fiber ribbon 151 along the arcuate guiding face 9 of the guide groove 4 as shown in FIG. 4(*b*); and curing the resin 12 to fix the optical fiber ribbon 151; thereafter, the connector main body 2 is removed from the plate 40. Thereby, the resin 12 intervenes between the bottom portion of the guide groove 4 and the end face of the optical fiber ribbon 151. In the optical fiber module 3 having the optical fiber ribbon 151 and the optical connector 1 therefore, irregularity of end face of the optical fiber ribbon 151 will be optically eliminated (refractive index matching) as shown in FIG. 4(*d*) even the end face thereof is rough somewhat since the intervening of the resin 12 compensates such roughness.

In this example, the optical fiber ribbon 151 was arranged after the guide groove 4 had been filled with the resin 12. Alternatively, the optical fiber ribbon 151 may be arranged in the guide groove 4 before the resin 12 is filled. When arranging the optical fiber ribbon 151 in the guide groove 4, an arrangement in which the end face of the optical fiber ribbon 151 is positioned in contact with the surface of the plate 40, or instead positioned at a location recessed from the surface of the plate 40 by a predetermined distance (about 100 μm for example), may be practicable.

In FIGS. 4(*b*) and 4(*c*), the end face of the optical fiber ribbon 151 is positioned at slightly upper location than the underface of the connector main body 2 and the resin 12 intervenes between the end face of the optical fiber ribbon 151 and the underface (or a plane even to the underface) of the connector main body 2 covering the tip of the optical fiber ribbon 151. When the end face of the optical fiber ribbon 151 is irregular or not even as shown in FIG. 4(*d*), an arrangement, in which the optical fiber ribbon 151 is positioned so that the tip of a jut 31 on the end face thereof (the longest protrusion toward tiptop) will sit on a plane even to the underface of the connector main body 2 allowing the resin 12 to intervene between the irregular portion other than the jut 31 and the bottom portion of the guide groove 4, may be practicable. This means that, when the end face of the optical fiber ribbon 151 is made optically flat, it is not necessary to cover the entirety of tip of the optical fiber ribbon 151 with the resin 12.

In the fixing methods shown in FIGS. 4(*a*) to 4(*d*), a flat end face is attained without polishing the tip of the optical fiber ribbon 151. This makes the operation for fixing the optical fiber ribbon 151 on the connector main body 2 easy. As for the resin 12, UV-curable resin or thermo-setting resin is preferable. When UV-curable resin is intended to be employed, it is suitable to form the connector main body 2 using a clear material that is UV-transparent. In selecting the resin 12, it is suitable to employ a material having the same refraction index as the cores of fibers in the optical fiber ribbon 151 have or a lens (this element will be described later) has. In detail, a resin 12 having refraction index of 1.3 to 1.7, preferably 1.46 to 1.6, will be suitable.

Figure 5:
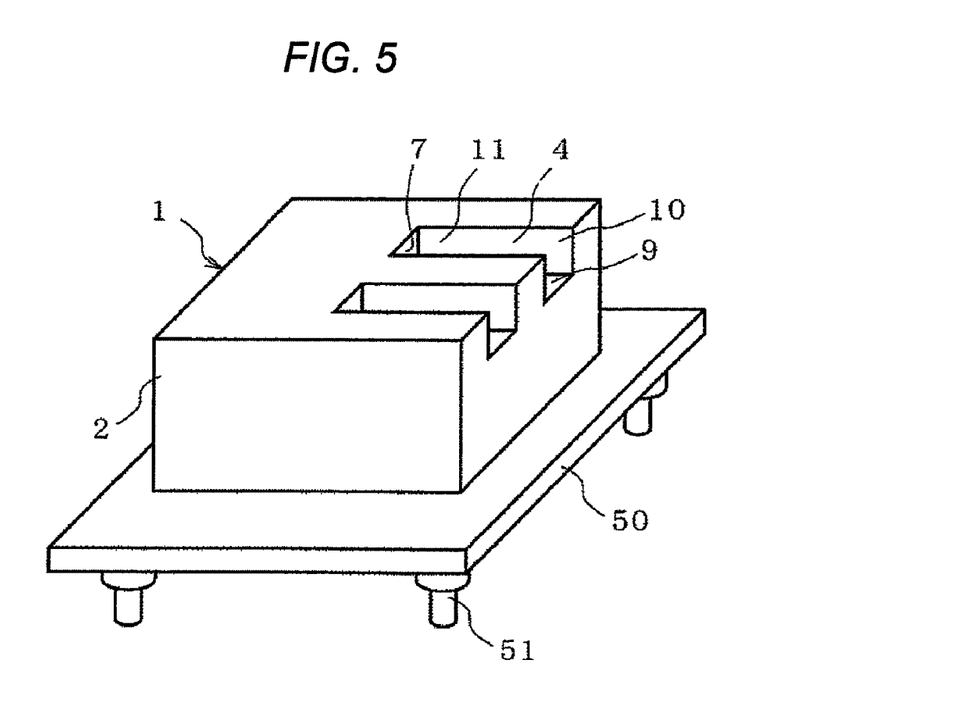
FIG. 5 This figure is a perspective view of the optical connector shown in FIG. 1 stuck on a transparent substrate.
Figure 6:
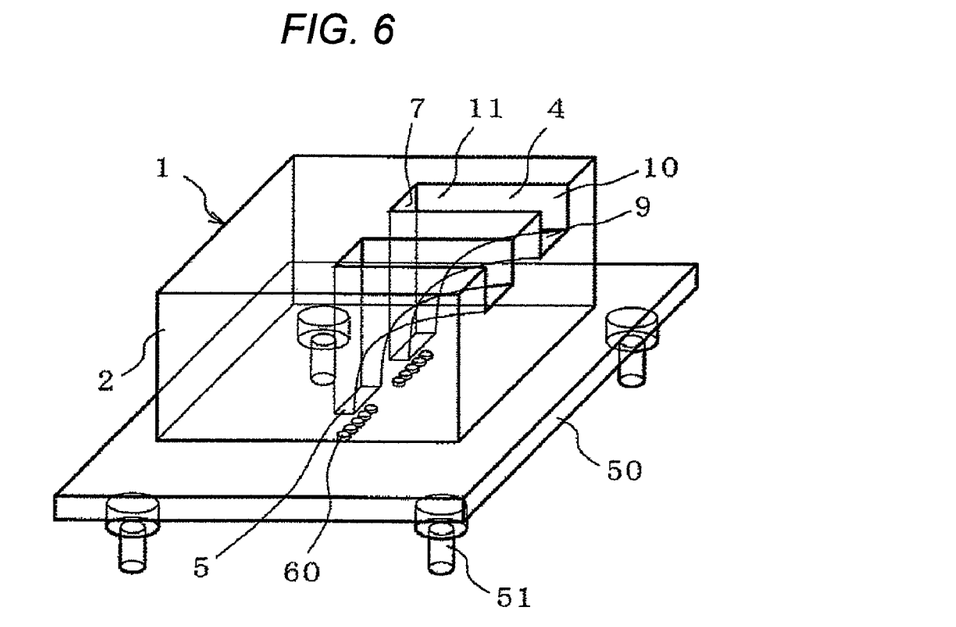
FIG. 6 This figure is a perspective through-view for FIG. 5.

In mounting on a substrate, the optical connector 1 is stuck on a transparent substrate (ceramic substrate) 50 and then the transparent substrate 50 is mounted on the substrate.

Plural protrusions 51 are provided on the underface of the transparent substrate 50 (in the four corners of the transparent substrate 50 for example); this is for installing the transparent substrate 50 on the substrate on which arrayed optical elements are mounted. A lens (micro-lens) 60 is installed on the underface of the transparent substrate 50.

In sticking the optical connector 1 on the transparent substrate 50, the optical axis of the lens 60 on the transparent substrate 50 is made to align with the optical axis of the end face of the optical fiber ribbon 151.

Figure 7:
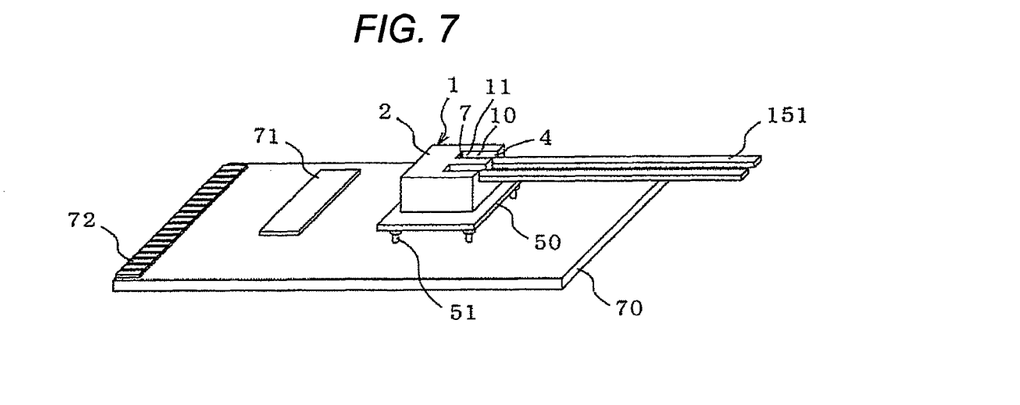
FIG. 7 This figure is a perspective view of the optical connector shown in FIG. 1 mounted on a substrate.
Figure 8:
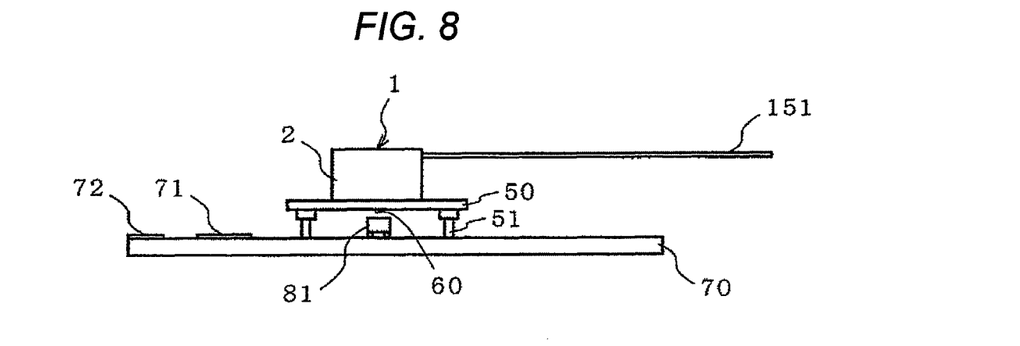
FIG. 8 This figure is a side elevational for FIG. 7.

The following explains an example in which a substrate 70 for High-definition Multimedia Interface (HDMI), shown in FIGS. 7 and 8, is used. However, the present invention is not limited to such method.

On the substrate 70, arrayed optical elements 81, a driver IC 71 for driving the arrayed optical elements 81, a terminal 72 for establishing electrical connection with external electrical devices (external communication equipment), etc. are mounted with wiring patterns (not illustrated) formed thereon.

Around the arrayed optical elements 81 on the substrate 70, fixing holes (not illustrated) are provided for positioning and fixing the transparent substrate 50 having the optical connector 1 stuck thereon. The fixing hole is formed at such a position that the optical axis of the lens 60 aligns with the optical axis of each surface-emitting face (or surface-receiving face) of the arrayed optical elements 81.

The optical connector 1 is installed with the protrusion 51 provided on the transparent substrate 50 inserting into the fixing hole. Thereby, the optical axis of the end face of the optical fiber ribbon 151 aligns with the optical axis of each surface-emitting face (or surface-receiving face) of the arrayed optical elements 81 with the optical fiber ribbon 151 and the arrayed optical elements 81 optically connected.

The following explains details of the optical connector 1 and an optical fiber module, which has an optical fiber ribbon and the optical connector 1, in Embodiment 1 of the present invention.

The optical connector 1 of the present invention uses the guide groove 4 as a guiding groove for holding the optical fiber ribbon 151 to make its end face opposed to each surface-emitting face or surface-receiving face of the arrayed optical elements. This permits the optical fiber ribbon 151 to be led out in multiple directions. In other words, the leading-out direction of the optical fiber ribbon 151 can be optionally changed in the rage from the top face of the optical connector 2 to the side face thereof.

This feature eliminates dependence on the variety of lead-out directions in choosing different optical connectors with complication in wiring operation prevented.

Further, since the guide groove 4 enlarges upwardly its opening, the tip of the optical fiber ribbon 151 will not be damaged while its being inserted into the guide groove 4.

In the embodiment 1, the optical connector 1 and the transparent substrate 50 are separate bodies; however, the optical connector 1 and the transparent substrate 50 may be integrally configured in one body. Further, in Embodiment 1, the transparent substrate 50 has the lens 60; however, the lens 60 may be omitted.

Figure 9:
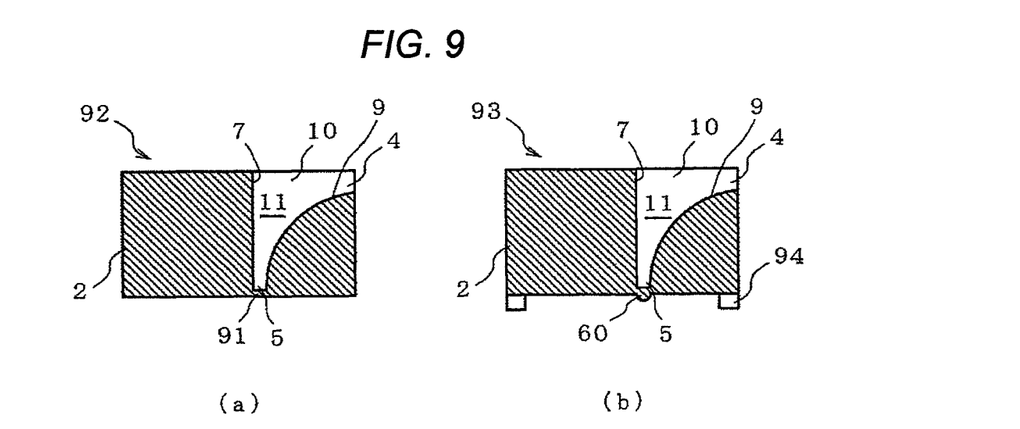
FIGS. 9(a) to 9(b) are figures that show modification examples of the optical connector shown in FIG. 1.

In Embodiment 1, the bottom portion of the guide groove 4 is a through-hole. However, it may be practicable to use such an optical connector 92 that the bottom portion of the guide groove 4 is sealed with a sealing 91 formed integrally in one body with the underface of a connector main body 2 as shown in FIG. 9(*a*). In this configuration, the connector main body 2 should be constituted of a material transparent to the light which the optical fiber ribbon 151 transmits.

Figure 10:
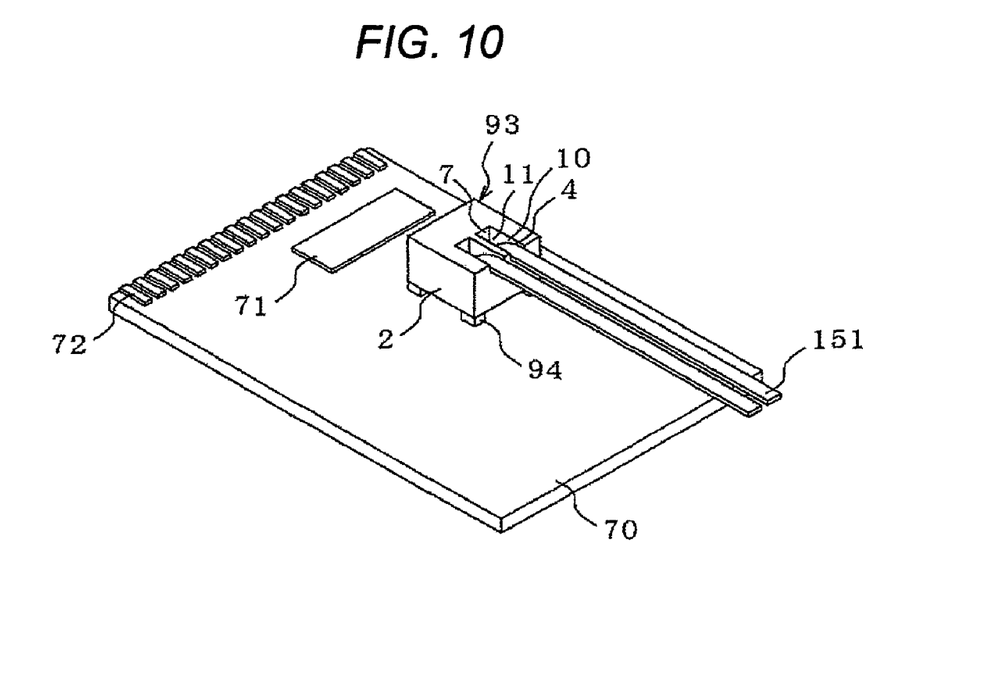
FIG. 10 This figure is a perspective view of the optical connector shown in FIG. 9(b) mounted on a substrate.
Figure 11:
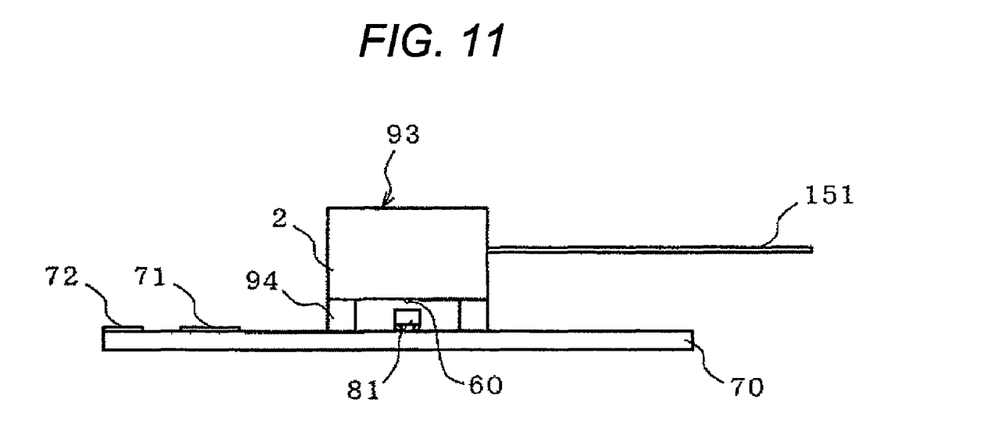
FIG. 11 This figure is a side elevational view for FIG. 10.

It may further be practicable to use such an optical connector 93 that the lens 60 is provided integrally in one body with the sealing 91 on the bottom portion thereof as shown in FIG. 9(*b*). In this configuration, it is feasible to install the connector main body 2 directly on the substrate 70 without use of the transparent substrate 50 as shown in FIGS. 10 and 11 helped by plural legs 94 (four legs in the case of FIG. 9(*b*)) provided on the underface of the connector main body 2. Then, the number of parts will be reduced since the transparent substrate 50 is not required.

In fixing the optical fiber ribbon 151 using the optical connectors 92 and 93 shown in FIGS. 9(*a*) and 9(*b*), it would be suitable to take the steps of: filling the guide groove 4 having a sealed bottom portion with the resin 12; inserting the optical fiber ribbon 151 into the guide groove 4; and then curing the resin 12 to fix. Thereby, the end face of the optical fiber ribbon 151 is made flat without using the smooth-face plate 40 in the fixing method explained referring to FIGS. 4(*a*) to 4(*c*).

In this practice, the lens 60 is provided underface of the sealing 91 integrally; alternatively, closing the bottom portion of the guide groove 4 only with the lens 60 may be practicable.

The optical fiber module of the present invention is fabricated undergoing the processes of: filling in advance the guide groove 4 with the curable resin 12, inserting the optical fiber ribbon 151 into the guide groove 4 filled with the resin 12, making the resin 12 intervene between the bottom portion of the guide groove 4 and the end face of the optical fiber ribbon 151 to make irregularity of the end face thereof optically eliminated, and curing the resin 12.

Thereby, irregularity of end face of the optical fiber ribbon 151 will be optically eliminated (refractive index matching) even the end face thereof is rough somewhat, since the intervening of the resin 12 compensates such roughness.

Thus, the end face of the optical fiber ribbon 151 can be flattened without polishing; therefore, the optical fiber ribbon 151 can be connected optically with the arrayed optical elements without end face polishing. Because of this feature, the breakage of tip of the optical fiber ribbon 151 and positional deviation with the arrayed optical elements (misaligning of the optical axis) due to polishing is prevented. In addition, this feature cuts the manufacturing costs since the polishing process is not necessary.

Next, Embodiment 2 will be explained.

Figure 12:
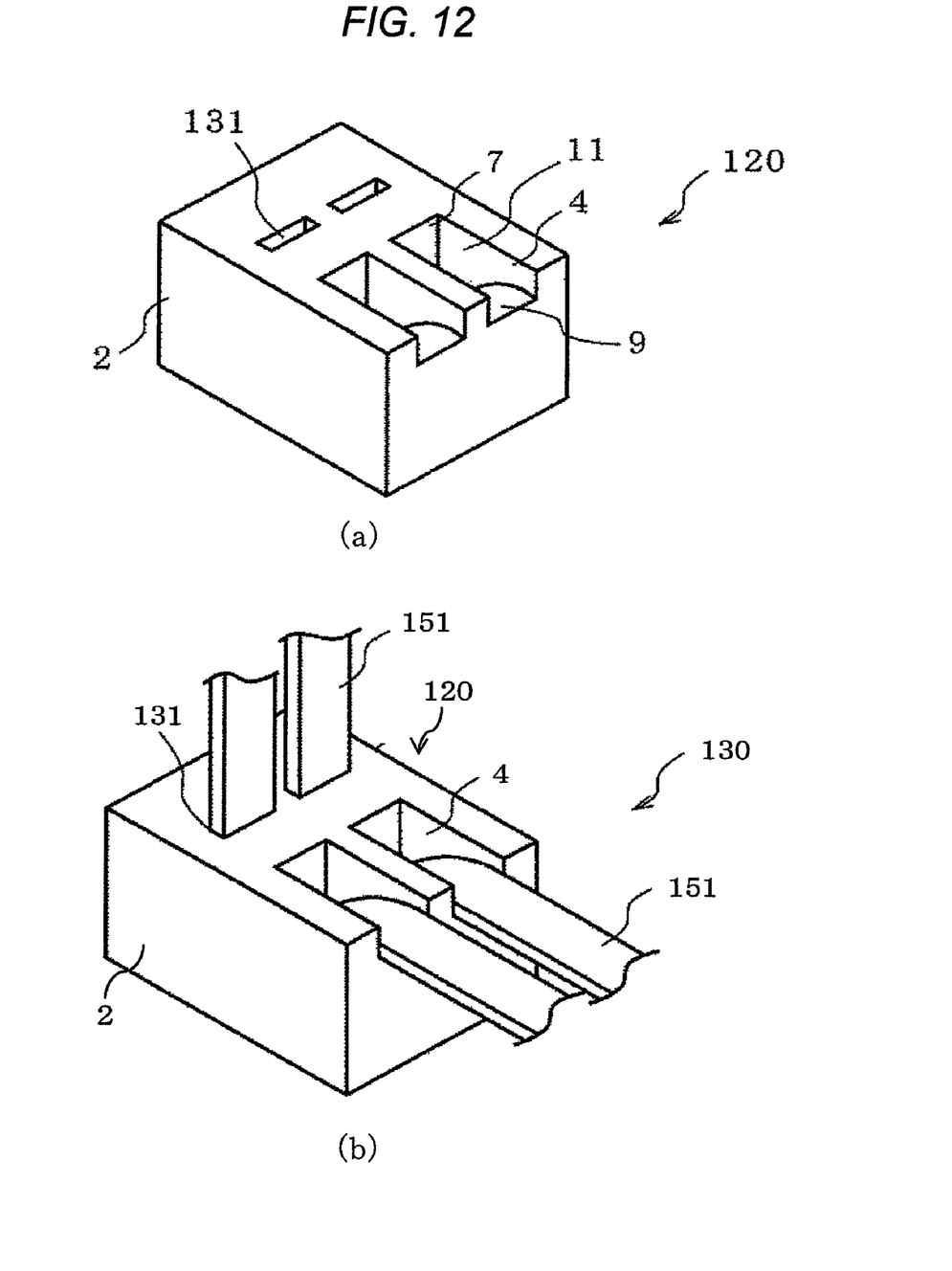
FIG. 12(a) is a perspective view of the optical connector according to an embodiment of the present invention.
FIG. 12(b) is a perspective view of an optical fiber module having an optical fiber ribbon and the optical connector.

An optical connector 120 shown in FIGS. 12(*a*), 13(*a*) to 13(*d*) has such a construction that a vertical guiding slot 131 is provided additionally to the guide groove 4 in the optical connector 1 shown in FIG. 1. FIG. 12(*b*) shows an optical module 130 that has the optical fiber ribbon 151 and the optical connector 120.

Figure 13:
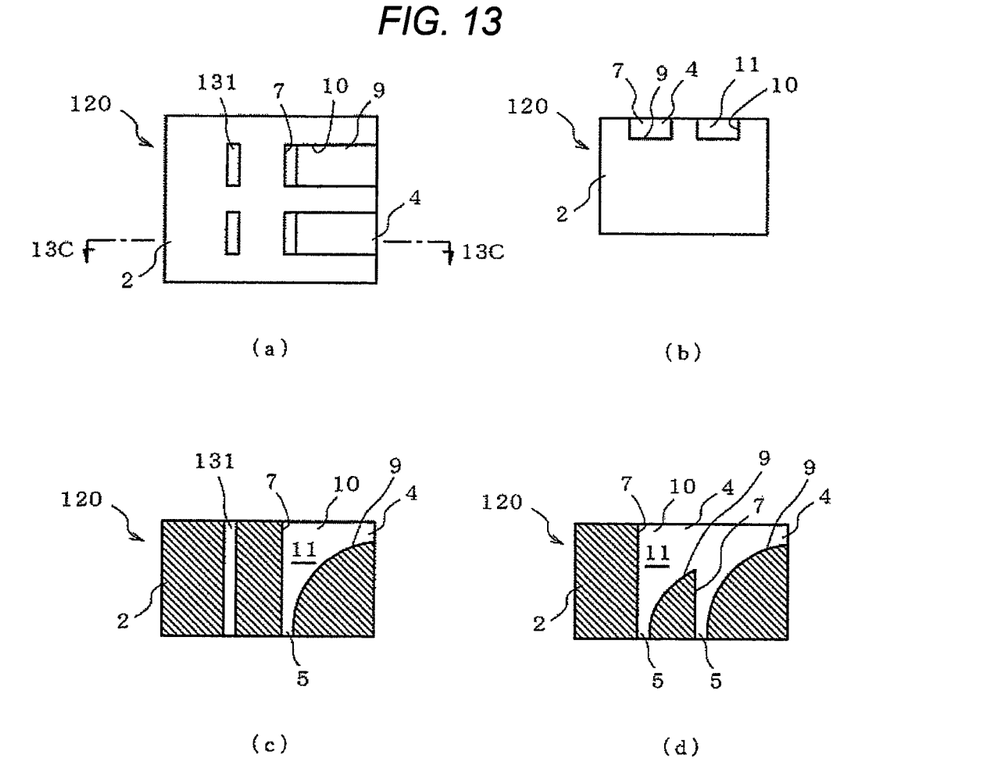
FIG. 13(a) is a top view of the optical connector shown in FIG. 12.
FIG. 13(b) is a side elevational view of the optical connector shown in FIG. 12.
FIG. 13(c) is a cross-sectional view of the optical connector shown in FIG. 12 sectioned along the line 13C-13C.
FIG. 13(d) is a figure that shows a modification example of the optical connector shown in FIG. 12(a) and FIG. 12(b).

More specifically, the construction is such that two or more vertical guiding slots 131 for guiding the optical fiber ribbon 151 vertically and two or more guide grooves 4 are provided in the connector main body 2 in a longitudinal direction of the optical fiber ribbon 151 (FIGS. 13(*a*) to 13(*d*) show an example of two ranks of one each).

In the optical connector 120, the direction of leading out the optical fiber ribbon 151 can be chosen as desired within the range from the top face side to the side face side of the connector main body 2 and at the same time the optical fiber ribbon 151 arranged in the vertical guiding slot 131 can be led out toward the top face side of the connector main body 2. Thus, numbers of the optical fiber ribbons 151 can be wired varying their leading out directions. Further, the optical fiber ribbons 151 can be connected to a maximum of four (two sending/receiving pairs) offering highly densified and large capacity wiring system.

The optical connector 120 permits the optical fiber ribbon 151 to be led out in the top face side of the connector main body 2 to a maximum of four and in the side face side of the same to a maximum of two; this feature provides a variety in determination of proper leading-out direction depending on use applications.

Fixing the optical fiber ribbon 151 on the optical connector 120 undergoes, as described in the explanation of Embodiment 1, the processes of: placing the plate 40 having a smooth-face on the underface of the connector main body 2 to seal the bottom portion of the guide groove 4; filling the resin 12 in the guide groove 4; arranging the optical fiber ribbon 151 so that the resin 12 will intervene between the end face of the optical fiber ribbon 151 and the bottom portions of the vertical guiding slot 131 and of the guide groove 4; and curing the resin 12 to fix the optical fiber ribbon 151.

Thereby, irregularity of end face of the optical fiber ribbon 151 will be optically eliminated (refractive index matching) as well as the optical fiber module shown in FIG. 4(*d*) even the end face thereof is rough somewhat since the intervening of the resin 12 compensates such roughness.

Thus, the end face of the optical fiber ribbon 151 can be flattened without polishing; therefore the optical fiber ribbon 151 can be connected optically with the arrayed optical elements without end face polishing. Because of this feature, the breakage of tip of the optical fiber ribbon 151 or positional deviation with the arrayed optical elements (misalignment of the optical axis) due to polishing is prevented. In addition, this feature cuts the manufacturing costs since the polishing process is not necessary.

In Embodiment 2, the vertical guiding slot 131 and the guide grooves 4 are provided in the longitudinal direction. However, the vertical guiding slot 131 may be substituted with another guide groove 4 as shown in FIG. 13(*d*). In this case, the arcuate guiding face 9 of the guide groove 4 on the left side in the cited figure is shaped to intersect the vertical guiding face 7 of the guide groove 4 on the right side in the figure.

Providing a plurality of the guide grooves 4 in the longitudinal direction permits a plurality of the optical fiber ribbons 151 to be led out in the same direction or severally in the different directions.

Figure 14:
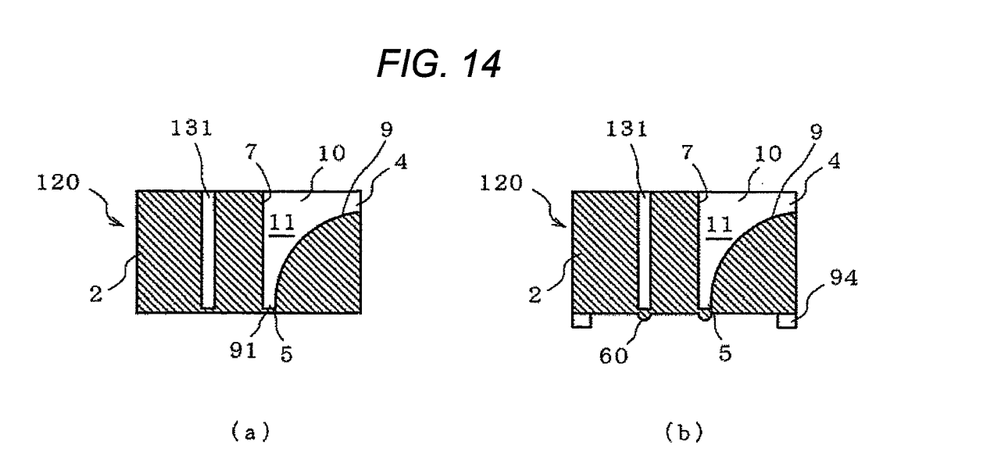
FIGS. 14(a) and 14(b) are figures that show modification examples of the optical connector shown in FIG. 12(a) and FIG. 12(b).

Further, similarly to Embodiment 1, the bottom portions of the vertical guiding slot 131 and the guide groove 4 may be sealed by the sealing 91 formed integrally in one body with the underface of the connector main body 2, or instead the lens 60 may be provided integrally in one body with the sealing 91 as shown in FIG. 14(*b*).

As stated above, the optical connector 120 provides the same advantageous effects that Embodiment 1 offers in addition to the same that Embodiment 2 offers.

The following will explain another embodiment of the present invention.

Figure 15:
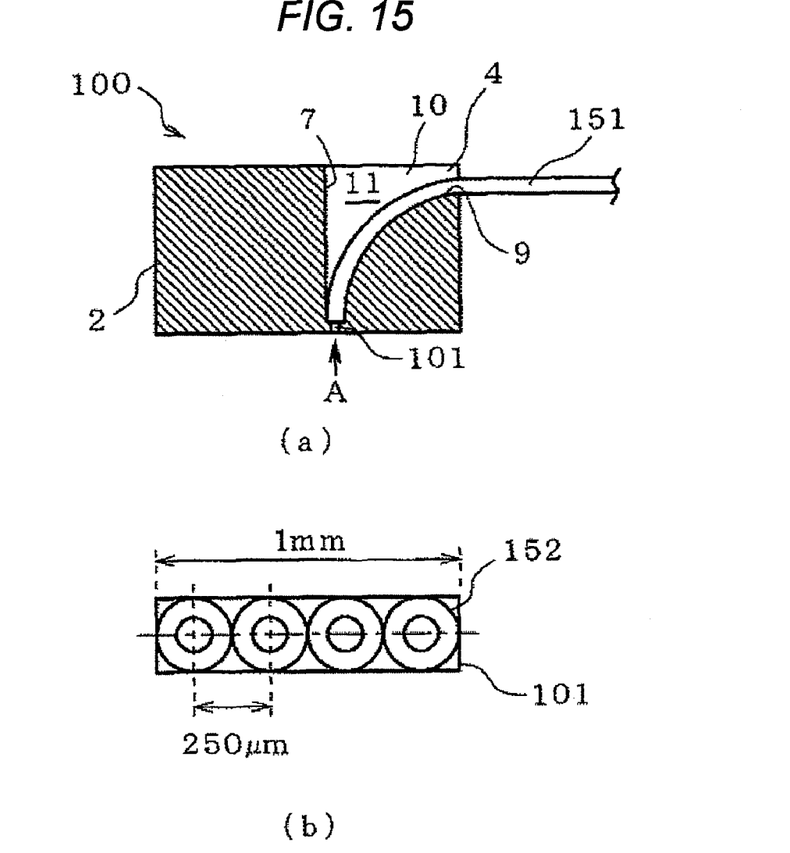
FIG. 15(a) is a cross-sectional view of the optical connector according to an embodiment of the present invention.
FIG. 15(b) is a plan view of the optical fiber positioning slot viewed from the point A in FIG. 15(a).

An optical connector 100 shown in FIG. 15(*a*) has such a construction that an optical fiber positioning slot 101 is provided on the end (bottom portion) of the guide groove 4 of the optical connector 1 shown in FIGS. 1(*a*) and 1(*b*) for holding and fixing an optical fiber 152 that is a projected optical fiber formed by removing the jacket over the tip of the optical fiber ribbon 151.

In the optical fiber ribbon 151 generally, the outer diameter of the optical fiber 152 can be formed accurately but applying its jacket accurately is not easy.

Therefore, when the optical axis alignment between the arrayed optical elements and the optical fiber 152 is required to be highly accurate, it is preferable to remove the jacket over the tip of the optical fiber ribbon 151 to project the optical fiber 152 and then to position the projected optical fiber 152 relying on the optical fiber positioning slot 101.

For example, when the optical fiber ribbon 151 is a four-fiber ribbon and the external diameter of the optical fiber 152 is 250 μm as shown in FIG. 15(*b*), it is appropriate to make the optical fiber positioning slot 101 have a width of 1 mm and a height, or a depth, of 250 μm. Thereby, it becomes practicable to closely arrange four optical fibers 152 on the input-end or output-end with the positioning accuracy increased.

It is to be understood that the present invention is not limited in its implementation to the above-stated embodiments and may be practiced in various modifications without departing from the scope of the present invention.

The invention claimed is:

1. An optical connector for connecting the end face of an optical fiber ribbon optically with arrayed optical elements on a substrate, comprising:
    a connector main body having a bottom face parallel to said substrate; and
    a guide groove formed on said connector main body in which said optical fiber ribbon is arranged,
    wherein said guide groove comprises:
    an end face holding slot that holds said optical fiber ribbon so that an end face of said optical fiber ribbon on a bottom face of said connector main body facing said substrate opposes to said arrayed optical elements,
    a vertical guiding face perpendicular to said substrate and extending from one side of said end face holding slot on said bottom face of said connector main body to a top face thereof,
    an arcuate guiding face formed in an arc-shape extending from an opposing other side of said end holding slot to a side face of said connector main body, and
    a positioning face for widthwise positioning and fixing said optical fiber ribbon formed perpendicularly to said substrate adjoining both said vertical guiding face and said arcuate guiding face,
    wherein said vertical guiding face and said arcuate guiding face and said positioning face define a space that opens toward a top face of said connector main body,
    wherein each of the surfaces of the vertical guiding face and the arcuate guiding face is smooth, and
    wherein the connector main body has the vertical guiding face, the arcuate guide face and the positioning face are formed as a single integrated piece.

2. The optical connector according to claim 1, wherein said arcuate guiding face of said guide groove ends in the side face of said connector main body at a position lower than the top face thereof by a distance equal to the thickness of said optical fiber ribbon or more distance.

3. The optical connector according to claim 1, wherein said connector main body has a plurality of said guide grooves.

4. The optical connector according to claim 1, wherein the bottom portion of said guide groove on the bottom face of said connector main body is formed integrally in one body with said connector main body and is sealed.

5. The optical connector according to claim 1, wherein said connector main body has a lens provided integrally in one body with the bottom face thereof, and the bottom face is opposed to the end face of said guide groove.

6. The optical connector according to claim 1, wherein said connector main body has a transparent substrate provided integrally in one body with the bottom face thereof, and the bottom face is opposed to the end face of said guide groove.

7. The optical connector according to claim 1, wherein said connector main body is further comprised of a vertical guiding slot for arranging said optical fiber ribbon perpendicularly to said substrate.

8. An optical fiber module comprising an optical fiber ribbon and an optical connector for connecting an end face of said optical fiber ribbon with arrayed optical elements on a substrate, wherein said optical connector is comprised of an optical connector defined in claim 1, that has a connector main body having a bottom face parallel to said substrate and a guide groove provided on said connector main body for arranging said optical fiber ribbon, and wherein a resin having the same refraction index as the core of said optical fiber ribbon is filled in said guide groove formed on said connector main body for making one end of said optical fiber ribbon arranged perpendicularly to said substrate at the bottom face of said connector main body so as to intervene between said end face of said optical fiber ribbon and said bottom face of said connector main body.

9. An optical fiber module according to claim 8, wherein the end face of the optical fiber ribbon is comprised of an unpolished end face having uneven portions and the uneven portions are filled with the resin to be made optically flat.

* * * * *